Dec. 26, 1944.  L. A. TROFIMOV  2,365,982
POWER APPARATUS FOR POSITIONING GUN TURRETS
Filed Aug. 6, 1942
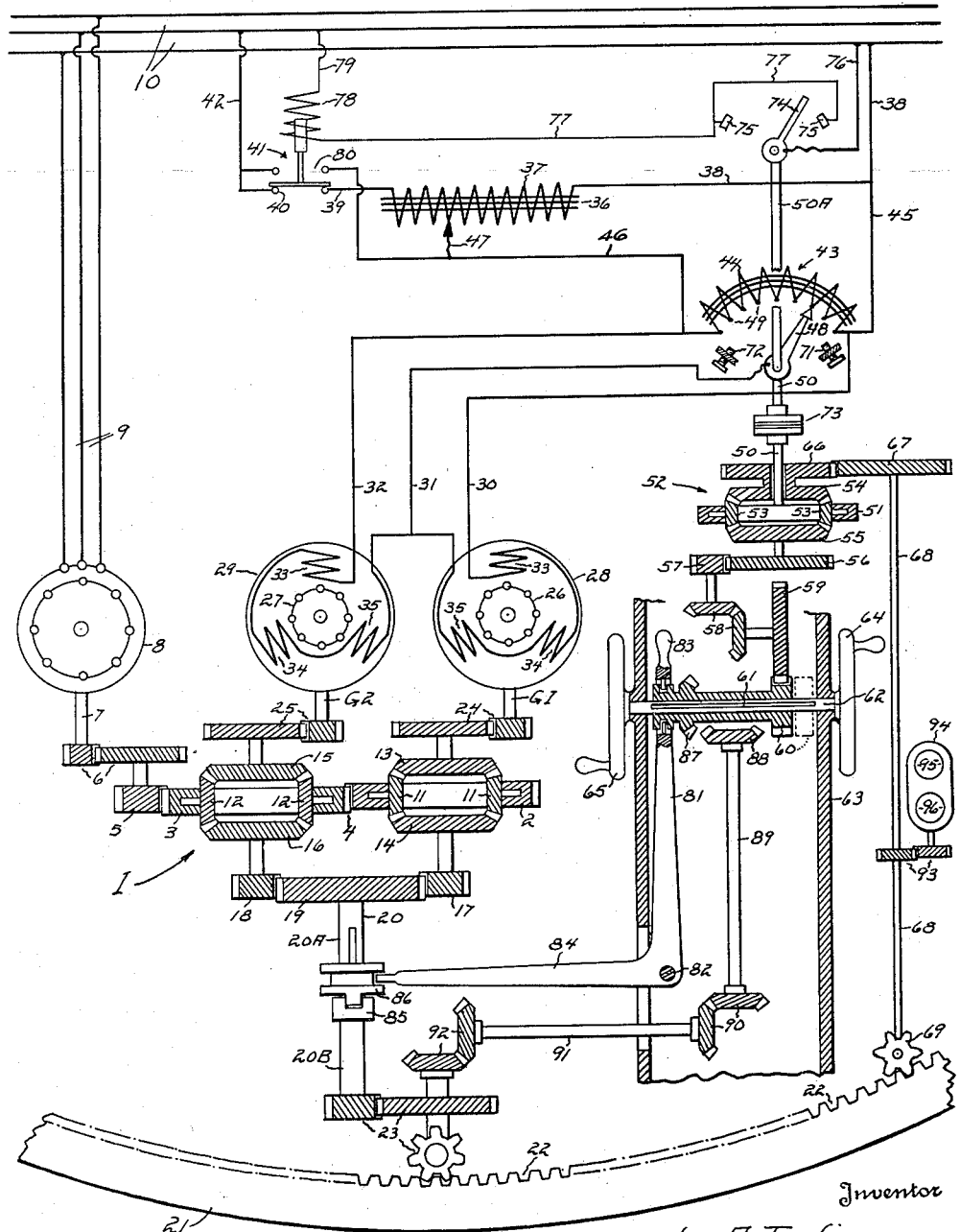
Inventor
Lev A. Trofimov
By Harry P. Canfield
Attorney Patented Dec. 26, 1944

2,365,982

UNITED STATES PATENT OFFICE 2,365,982

POWER APPARATUS FOR POSITIONING GUN TURRETS

Lev A. Trofimov, Willoughby, Ohio

Application August 6, 1942, Serial No. 453,810

4 Claims. (Cl. 172—239)

This invention relates to power apparatus and controls therefor for applying the power of a motor to the moving and positioning of a gun turret to aim the guns thereof.

The invention comprises in general a continuously running electric motor; a transmission through which power of the motor is transmitted to the turret; a transmission controller to cause the transmission to transmit forward or reverse power to the turret to cause it to move in alternate directions and to discontinue the transmission of power to bring it to rest; and a manual controller or pilot for actuating the controller.

The manual controller is of the rotary wheel type and the turret is caused to move in a direction and at a speed corresponding to the direction and speed of rotation of the manual controller, and to come to rest when the manual controller is brought to rest.

Means is also provided by which optionally the turret may be moved and positioned as referred to, directly by manual power applied by the manual controller.

The primary object of the invention is to provide a power apparatus and a control therefor such as that referred to and operating in an improved manner.

Other objects are:

To provide a power apparatus of the type referred to in which the speed and direction of the turret are determined by the respective electric output loads of a pair of electric generators which are driven by the motor through the transmission, and the respective loads of the generators being adjustably variable by adjusting the output potential of an electric transformer;

To provide a power apparatus and control of the type referred to in which the aforesaid transformer is energized at reduced potential from alternating current supply mains and in which when the transformer is adjusted to its maximum output potential, it automatically becomes energized at the full potential of the supply mains.

Other objects will become apparent to those skilled in the art to which my invention appertains.

My invention is fully disclosed in the following description taken in connection with the accompanying drawing which illustrates diagrammatically an embodiment of my invention.

Referring to the drawing I have shown generally at 1 a double differential gearing comprising a pair of spider elements 2 and 3 arranged to be rotatably driven in opposite directions; and as shown in the drawing this may conveniently be accomplished by providing gear teeth on the respective spider elements and meshing the teeth together as at 4, and meshing a driving pinion 5 with the teeth of one of the spider elements, for example the spider element 3. The driving pinion 5 is connected through speed reduction gearing 6 to the shaft 7 of an electric motor 8.

It is preferable that the motor 8 be a substantially constant speed motor and that it run continuously, and to these ends it is as shown a three phase squirrel cage induction motor connected by wires 9 to a three phase alternating current supply source 10; but it will be understood that the motor 8 may be started and stopped by a suitable switch or contactor arrangement of well-known type, not shown for the sake of simplicity in the drawing.

The spider element 2 rotatably supports pinions 11—11, and the spider element 3 similarly rotatably supports pinions 12—12.

Meshed with the pinions 11—11 are rotary differential gears 13 and 14, and meshed with the pinions 12—12 are rotary differential gears 15 and 16.

The differential gears 14 and 16 are connected respectively to pinions 17 and 18, both of which are meshed with a gear 19 connected to what may be called a load shaft 20.

The gun turret to be driven, as mentioned hereinbefore, may be of the usual known construction and comprise a portion rotatable in alternate directions around a generally vertical axis by which guns on the turret may swing in alternate directions transversely to position and aim them; and a fragment of this movable part of the turret is shown at 21 and is provided with a circular gear rack or internal gear 22, concentric with its axis of rotation; and by means of reduction ratio gearing shown generally at 23, the load shaft 20 rotatably drives the gun turret portion 21 by its gear 22 in one direction or the other, and brings it to rest, in accordance with rotation of the load shaft 20 in one direction or the other and the cessation of rotation thereof.

The differential gears 13 and 15 above referred to are connected through step-up-ratio gears 24 and 25, respectively, to shafts G1 and G2 which are connected respectively to the rotors 26 and 27 of electric generators indicated generally at 28 and 29.

These generators, to be more fully described, have electrical output load circuits 30—31 and 32—31, the electrical loads in which may be adjustably varied in a manner to be described.

With the arrangement thus far described, torque of the motor 8 transmitted to the spider elements 2 and 3, divides at the spiders, one part being transmitted to the shafts G1 and G2 to drive the generators in opposite directions, and the other part being transmitted to the pinions 17 and 18 in opposite directions and tending to drive the load shaft 20. If the electrical loads on the generators 28 and 29 are adjusted to be equal, the shafts G1 and G2 driving them and the differential gears 13 and 15 driving the shafts will rotate at equal speeds. This follows from the fact that the torques developed at the differential gears 13 and 15 to drive the generators are then equal.

The torques of the differential gears 13 and 15 being equal, the torques of the differential gears 14 and 16 will be equal, and, being transmitted to the load shaft 20 in opposite directions through the pinions 17 and 18, the pinions 17 and 18 cannot rotate, and under these circumstances, the load shaft 20 remains at rest, and the differential gears 14 and 16 remain at rest and the differential gears 13 and 15 are driven at twice the speed of the spider elements 2 and 3.

If now the load on one of the generators, say the generator 28, be made greater than that on the generator 29, the differential gear 13 will rotate more slowly than the differential gear 15, and this will cause the speed and torque of the pinion 17 to be greater than that of the pinion 18 and it will drive the load shaft 20 in a corresponding direction; and similarly if the load of the generator 29 be made greater than that of the generator 28, the load shaft 20 will be driven in the other direction; and when the loads are again adjusted to be equal, the load shaft will again be brought to rest.

Because of the intermeshed gear arrangement, the differential gears 13 and 15 are always constrained to rotate at speeds the arithmetical sum of which is constant. If one increases the other must decrease and vice versa. Therefore upon increasing the load on one generator, say on the generator 28, to make it run slower, it is advisable to decrease the load on the generator 29 to allow it to run faster. So that, for optimum performance and efficiency it is advisable to provide a generator load varying means which may be actuated to increase the load on either generator and concurrently decrease that on the other. A means for changing the generator loads in this manner will now be described.

The generators 28 and 29 are preferably alternating current induction generators and have the physical construction of three phase squirrel cage induction motors, the rotors of which are driven; and in order to simplify the external circuits of the stators, the three phase stator windings are connected in series with each other, providing in effect a single phase stator winding, and this has been shown in the drawing diagrammatically wherein, for example in the generator 28, the stator windings 33, 34, 35 are all connected in series and connected to an external circuit 30—31; and similarly for the generator 29 and its external circuit 32—31.

In general if a squirrel cage induction motor has its stator field winding energized from an alternating current supply source at the frequency of the source, producing in the stator a rotary field rotating at a velocity corresponding to the frequency, and if the squirrel cage rotor be driven at a speed above this velocity, alternating current will be generated in the field windings and delivered back to the supply mains, the circuit to the fields thus functioning both as an exciting circuit and as the electrical load output circuit of the generator. This principle is employed with respect to the generators 28 and 29, the circuits 30—31 and 32—31 functioning in these respects.

It follows that if the exciting potential supplied to the circuit 30—31 be increased and that to the circuit 32—31 be decreased, the electrical loads delivered by the generators 28 and 29 over these circuits will be increased and decreased respectively, and the torque required to drive the generators will be increased and decreased respectively; and the rotor of one generator will rotate more slowly and that of the other more rapidly as and for the purposes described. And to thus vary the potential supplied to the fields of the generators the following means is provided.

At 36 is shown generally a single phase autotransformer, the winding 37 of which is energized from two of the three phase supply mains 10, one end of the winding being connected by a wire 38 to one of the supply mains, and the other end of the winding being connected by a wire 39 through normally closed contacts 40 of a magnetic contactor 41, and thence by a wire 42 to another of the supply mains 10.

A single phase potential adjusting auto-transformer is shown at 43, and has a winding 44, one end of which is connected by a wire 45 to the wire 38, or to one end of the transformer winding 37, and the other end of which is connected by a wire 46 to an adjustable tap connection 47 or the auto-transformer 36; whereby as will be apparent the adjustable transformer winding 44 is energized from the supply mains 10 at reduced potential for purposes to be referred to.

An arm 48 rotatably movable in alternate directions, engages by its movement, tap connections 49 on the winding 44 of the transformer 43. The above-mentioned circuit wires 30 and 32 are connected to opposite ends of the winding 44, and the circuit wire 31 is connected to the arm 48.

By this arrangement, as is believed now to be apparent to those skilled in the art, when the arm 48 is on a mid tap of the winding 44, the circuits 30—31 and 32—31 will be energized equally, and the generators 28 and 29 will deliver equal alternating current loads over these circuits back to the supply source; and similarly if the arm 48 be moved in either direction from the mid-tap a corresponding one of the generators will develop greater load and the other smaller load.

Means will now be described by which an operator operating a manual pilot or control may move the arm 48 in one direction or the other, which, as will now be clear, causes the turret to rotate in one direction or the other; and by which movement of the turret itself restores the arm 48 to the mid-tap position to again equalize the loads on the generators and cause the turret to come to rest.

A shaft 50 is connected to the arm 48 to alternately rotate it, and the shaft 50 is connected to the spider element 51 of a control differential gearing shown generally at 52. The spider element 51 rotatably supports pinions 53—53 meshed with differential gears 54 and 55.

The differential gear 55 is connected through speed reduction gearing, comprising gears 56 to 59 inclusive, to a pinion 60 drivingly connected by a spline 61 to a shaft 62, which allows axial movement of the pinion 60 on the shaft; and the shaft is rotatably supported upon a housing 63, fragmentarily shown, and the shaft, on the opposite end thereof, has connected thereto a pair of hand wheels 64 and 65.

The other differential gear 54 of the differential gearing 52 comprises, or has connected thereto, a gear 66 meshed with a gear 67 connected by a shaft 68 to a pinion 69 meshed with the circular rack or internal gear 22 on the turret concentric with its aforesaid axis of rotation.

With the arm 48 at rest in its aforesaid mid-tap position, the turret is at rest. The differential gear 54 and shaft 50 are also at rest. Rotation of either or both of the hand wheels 64—65 will rotate the pinion 60 and, acting through the aforesaid gears, will rotate the differential gear 55, and this gear reacting upon the pinions 53—53 and the stationary differential gear 54, will rotate the spider 51 and the shaft 50 and the arm 48 in one direction or the other, depending upon the direction in which the hand wheels were turned. This as described above causes the turret to begin to rotate, and as will now be apparent it rotates in a direction corresponding to the direction of rotation of the hand wheel 64—65.

Rotation of the turret transmitted through the rack 22, gear 69 and shaft 68, rotates the differential gear 54, and the gear connections are such that it rotates the differential gear 54 in the direction opposite to the rotation of the differential gear 55, and if the hand wheel 64—65 continues to be rotated at uniform velocity, the arm 48 will come to rest in an adjusted position, and the turret will continue to rotate at a corresponding speed. If now the hand wheel 64—65 be stopped, the turret will continue to rotate so long as the arm 48 is on other than its mid-tap position, and the turret movement, transmitted to the differential gear 54 and to the shaft 50 as described will move the arm 48 back toward its mid-tap position, and when it reaches the mid-tap position, the turret will stop moving.

Correlative with the above description, it will be understood that the more rapidly the hand wheels 64—65 are turned, the more rapidly will the turret move; and it will also be apparent that if it be desired to stop the turret quickly the hand wheels may be turned in the reverse direction with a "plugging" effect.

In the operation of the apparatus there may be times when in order to move and accelerate the turret as rapidly as possible, the operator may turn the hand wheel 64—65 so rapidly that the arm 48 will come to and pass beyond the last transformer tap; and to prevent this, mechanical limit stops for the arm 48, are provided as shown at 71—72; and coordinated therewith a slipping friction clutch 73 is provided in the line of the shaft 50, whereby the arm 48 may be stopped on the last tap, even if the hand wheel 64—65 be continuously rotated at excessively high speed.

Also, there may be times when, due to a low temperature to which the apparatus may be subjected, or due to stiffness of lubrication, etc. particularly when the apparatus is first started up after a considerable idle time period, it may be desirable to impress upon the exciting circuits of the generators 28 and 29, a higher potential than that possible with the adjustable transformer 43, and higher than it would be desirable to maintain continuously, in order to provide excess or abnormally high turret starting torque.

In such event, the operator of the hand wheel 64—65 would rotate the arm 48 to its extreme position in the effort to start the turret moving. An extension 50A of the shaft is provided and carries a contactor arm 74 which in either of the extreme rotated positions of the arm 48 engages one or the other of a pair of contacts 75—75. Upon engagement of either of these contacts, current flows from one of the supply mains 10 by a wire 76, to the arm 74, to the engaged contact 75, and by a wire 77 to the winding 78 of the aforesaid magnetic contactor 41, through the winding, and by a wire 79 back to another of the supply mains 10; and this current operates the contactor 41. Operation of the contactor 41 opens the contacts 40 and disconnects the transformer winding 37 from the supply mains 10, and closes normally open contacts 80 which connect the transformer winding 44 directly across the supply mains 10, instead of connecting it thereto at reduced voltage through the auto-transformer 36, so that the transformer 43 now supplies increased or abnormally high voltage to the generators.

As soon as the arm 48 begins to move back toward its mid-tap position, in the operation of the apparatus as described, engagement at the contact 75 is broken, and the magnetic contactor 41 is restored, and the reduced or normal potential is again supplied to the transformer 43.

There are times when it may be desirable to move the turret by hand operation upon rotating the hand wheel 64—65 instead of by motor power, and the following means is provided for this purpose.

A lever 81 is provided pivotally supported at 82 on the housing 63 and having a handle 83 for moving it, and it is provided with an arm 84. The load shaft 20 is in such case made in two parts, 20A and 20B, and a clutch comprising an element 85 on the part 20B is normally clutched to a part 86 on the shaft part 20A which is splined on the shaft part 20A and thereby rendered movable into and out of engagement with the part 85 by the arm 84 upon rocking the lever on its pivot.

The pinion 60 on the operator's shaft 62 and splined thereon for axial movement, has connected thereto and movable therewith a gear 87. Upon moving the lever 81 to disengage the aforesaid clutch, the lever also moves the pinion 60 and gear 87 on their spline connection, moving the pinion 60 out of engagement with the gear 59 (to a position indicated in dotted line) and moving the gear 87 into engagement with a gear 88 which is connected by a shaft 89, gears 90, a shaft 91, and gears 92, to the turret moving gears 23. After the lever 81 has been moved to disengage the clutch and engage the gears as described, rotation of the wheels 64—65 will, as will now be apparent, rotate the gear 88 and the parts connected therewith and through them will rotate the turret 21; and disengagement of the pinion 60 from the gear 59 by the lever disconnects the differential gearing 52 and arm 48 from the hand wheels.

This alternative arrangement may be used in an emergency in which the automatic control described might be disabled; or it may be used to initially adjust the position of the turret. In the latter instance, the turret will be at rest and the arm 48 at its mid point position. The lever 81 may then be operated as described and the turret then turned by hand independently of the power apparatus until the turret is in what may be called an intermediate or normal or zero position; and then the lever 31 may be restored and the power apparatus again brought into action; and thereafter operation of the hand wheel 64—65 will swing the turret in either direction from its said zero position.

As will be understood from the foregoing description, movement of the turret rotates the shaft 68; and the shaft 68 may be geared as at 93 to an indicating instrument 94 to indicate thereon the movement and the position of the turret, on dials 95 and 96 of the instrument. This instrument may be of well-known or suitable construction and may have a dial pointer which may be pre-set by an officer by remote electrical control to indicate to the operator of the hand wheel 64—65 the desired azimuth position of the guns, and may have a dial pointer coordinate therewith movable in correspondence with movement of the turret, whereby the operator, by observing the instrument, may operate the hand wheel 64—65 to cause the turret to move to and stop at the pre-set position. Such an instrument being well known does not in itself constitute a part of the present invention and it is thought to be unnecessary to further illustrate and describe it herein.

My invention is not limited in all respects to the exact details of construction illustrated and described. Changes and modifications may be made within the spirit of my invention, without sacrificing its advantages, and my invention comprehends all such changes and modifications which come within the scope of the appended claims.

Subject matter illustrated and described herein but not claimed is being claimed in my copending applications: Serial No. 445,745, filed June 4, 1942; Serial No. 446,083, filed June 6, 1942; Serial No. 436,309, filed March 26, 1942; Serial No. 460,051, filed October 2, 1942; and Serial No. 541,882, filed June 24, 1944.

I claim:

1. In combination with a rotary gun turret, an apparatus for applying power to move and position it comprising a continuously running motor; a rotary load shaft gear-connected to the turret to drive it; a gear transmission for transmitting motor torque to the load shafts; a pair of alternating current induction generators having alternating current stators and having rotors driven by the motor through the transmission, and controlling the transmission to cause it to drive the load shaft in alternate directions and bring it to rest in correspondence respectively with the development of a greater electrical load at one generator than at the other, and the development of a greater load at the other than at the one, and the development of equal loads; a source of alternating current; an auto-transformer energized from the source, and having single phase output circuits energizing the generator stators respectively, and which circuits are also the output circuits of the generators by which they supply generated alternating current back to the current source; means to vary the energization of the generator stators respectively, to vary their respective output loads, comprising taps on the transformer, and an arm movable alternately thereover; a pilot control comprising a manually rotatable element; a control differential gearing comprising a spider element rotatably supporting pinions and connected to the said alternately movable arm, and also comprising two differential gears meshed with the pinions, one differential gear being gear-connected to the manually rotatable element, and the other differential gear being gear-connected to the turret; the parts being arranged so that upon manual rotation of the rotatable element in either direction, the alternately movable arm is moved to unbalance the loads of the generators to cause the load shaft to move the turret in a corresponding direction, and upon stopping rotation of the rotatable element the alternately movable arm is moved by the turret to balance the loads of the generators and bring the turret to rest.

2. In combination with a rotary gun turret, an apparatus for applying power to move and position it comprising a continuously running motor; a rotary load shaft gear-connected to the turret to drive it; a gear transmission for transmitting motor torque to the load shaft; a pair of alternating current induction generators having alternating current single phase stators and having rotors driven by the motor through the transmission, and controlling the transmission to cause it to drive the load shaft in alternate directions and bring it to rest in correspondence respectively with the development of a greater electrical load at one generator than at the other, and the development of a greater load at the other than at the one, and the development of equal loads; a source of alternating current; an auto-transformer energized from the source, and having single phase output circuits energizing the generator stators respectively, and which circuits are also the output circuits of the generators by which they supply generated alternating current back to the current source; means to vary the energization of the generator stators respectively, to vary their respective output loads, comprising taps on the transformer, and an arm movable alternately thereover; a pilot control comprising a manually rotatable element; the alternately movable arm being gear-connected to the manually rotatable element and movable thereby to effect imbalance of the generator loads and rotation of the load shaft and turret, and being gear-connected to the turret and movable thereby to restore the generator loads to equality and stop the turret; a clutch between the load shaft and the turret; and optionally operable means to disengage the clutch and to disconnect the alternately movable arm from the manually movable element and to gear-connect the manually rotatable element to the turret for manual movement thereof.

3. In combination with a rotary gun turret, an apparatus for applying power to move and position it comprising a continuously running motor; a rotary load shaft gear-connected to the turret to drive it; a gear transmission for transmitting motor torque to the load shaft; a pair of alternating current induction generators having single phase alternating current stators and having rotors driven by the motor through the transmission, and controlling the transmission to cause it to drive the load shaft in alternate directions and bring it to rest in correspondence respectively with the development of a greater electrical load at one generator than at the other, and the development of a greater load at the other than at the one, and the development of equal loads; a source of alternating current; an auto-transformer energized from the source, and having single phase output circuits energizing the generator stators respectively, and which circuits are also the output circuits of the generators by which they supply generated alternating current back to the current source; means to vary the energization of the generator stators respectively, to vary their respective output loads comprising taps on the transformer, and an arm movable alternately thereover; a pilot control comprising a manually rotatable element; the alternately movable arm being gear-connected to the manually rotatable element and movable thereby to effect imbalance of generator loads and rotation of the load shaft and turret, and being gear-connected to the turret and movable thereby to restore the generator loads to equality and stop the turret; a voltage reducing transformer for stepping down the supply voltage to the auto-transformer; a magnetic contactor operable when energized to connect the auto-transformer directly to the source of supply; and a change-over contactor and circuit means controlled thereby operable responsive to movement of the alternately movable arm to an extreme position to effect energization of the magnetic contactor.

4. In combination with a rotary gun turret, an apparatus for applying power to move and position it comprising a double-differential transmission-gearing comprising a pair of rotary spider elements gear-connected to run in opposite directions and each rotatably supporting pinions; a continuously running alternating current electric motor continuously rotating the spider elements; a pair of first rotary differential gears meshed with the pinions of the spider elements respectively; a pair of alternating current induction generators having rotors connected respectively to the first differential gears, and having alternating current single phase stators; a pair of second differential gears meshed with the pinions of the spider elements respectively; a rotary load shaft gear-connected to the turret to drive it, and gear-connected to both of the second differential gears; whereby part of the motor torque is transmitted through the first differential gears to the generators to drive them; and whereby part of the motor torque is transmitted through the second differential gears to the load shaft and applied thereto in opposite directions, and at respective torques commensurable with the respective torques developed at the generators to drive them as determined by their respective electrical output loads; a source of alternating current; an auto-transformer energized from the source, and having single phase output circuits energizing the generator stators respectively, and which circuits are also the output circuits of the generators by which they supply generated alternating current back to the current source; means to vary the energization of the generator stators respectively, to vary their respective output loads, comprising taps on the transformer, and an arm movable alternately thereover; a pilot control comprising a manually rotatable element; a control differential gearing comprising a spider element rotatably supporting pinions and connected to the said alternately movable arm, and also comprising two differential gears meshed with the pinions, one differential gear being gear-connected to the manually rotatable element, and the other differential gear being gear-connected to the turret; the parts being arranged so that upon manual rotation of the rotatable element in either direction, the alternately movable arm is moved to unbalance the loads of the generators to cause the load shaft to move the turret in a corresponding direction, and upon stopping rotation of the rotatable element the alternately movable arm is moved by the turret to balance the loads of the generators and bring the turret to rest.

LEV A. TROFIMOV.